United States Patent [19]

King

[11] Patent Number: 4,810,561

[45] Date of Patent: Mar. 7, 1989

[54] MULTI-LAYERED TARGET

[76] Inventor: Karl P. King, R.D. #1, Box 247, Waynesburg, Pa. 15370

[21] Appl. No.: 122,187

[22] Filed: Nov. 18, 1987

[51] Int. Cl.$^4$ .................. B32B 3/00; B32B 23/02; F41J 5/02

[52] U.S. Cl. .................. 428/195; 428/192; 428/542.2; 428/539.5; 428/209; 273/348; 273/373; 273/408; 273/409

[58] Field of Search ............... 273/348, 373, 408, 409; 428/209, 211, 195, 192, 542.2, 542.4, 542.6, 539.5, 464

[56] References Cited

U.S. PATENT DOCUMENTS

| | | | |
|---|---|---|---|
| 164,525 | 6/1875 | Connery | 273/409 |
| 3,285,066 | 11/1966 | Lage | 273/408 |
| 4,462,598 | 7/1984 | Chalin et al. | 273/408 |

Primary Examiner—Ellis P. Robinson
Assistant Examiner—P. J. Ryan
Attorney, Agent, or Firm—Thomas R. Shaffer

[57] ABSTRACT

A multi-layered target is provided in which the shooter's results are permanently recorded and displayed as a work of art. A metallic sheet layer is used in conjunction with a covering layer upon which target dots are imprinted in a desired design or pattern. By successfully shooting the target dots of the covering layer, a shooter records his shot on the underlying metallic sheet layer. A successful round of shooting is reflected in the reproduction on the metallic sheet layer of the artistic design created by the target dots. The metallic sheet layer may be framed and hung as a constant remainder of a shooter's accuracy.

11 Claims, 2 Drawing Sheets

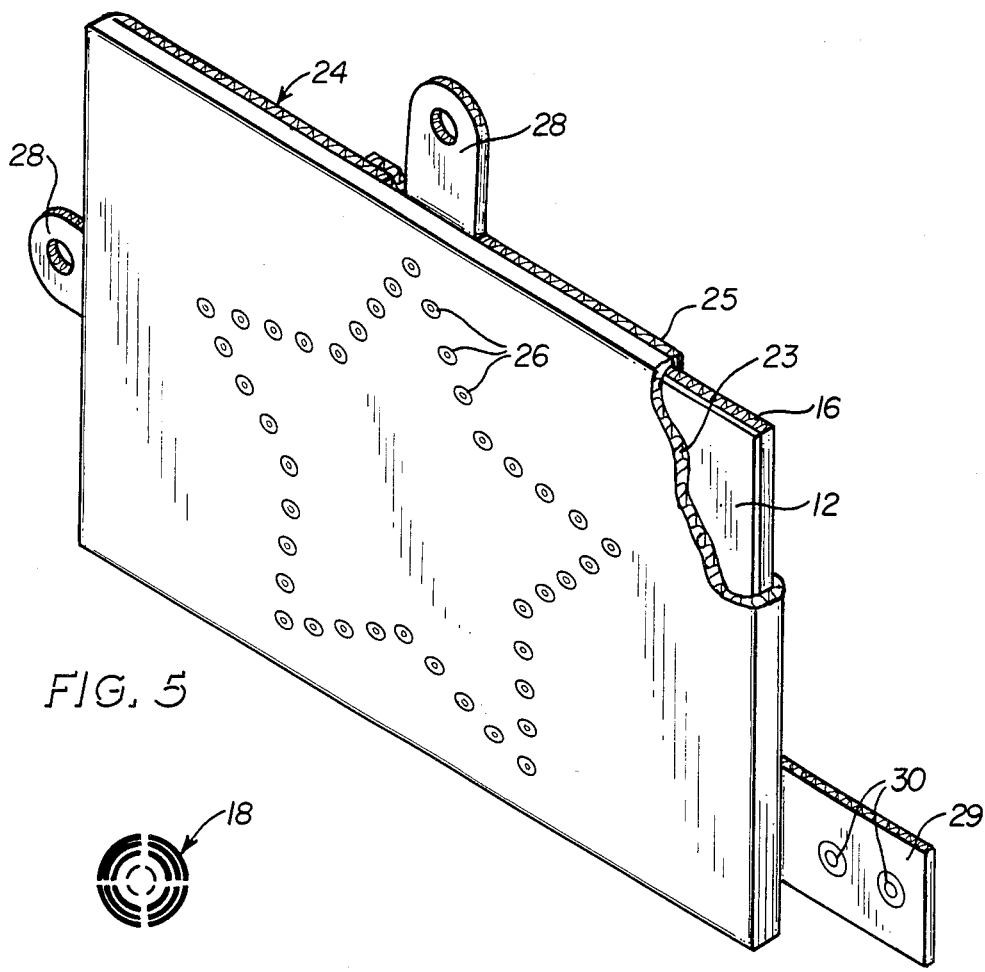
FIG. 5
FIG. 6
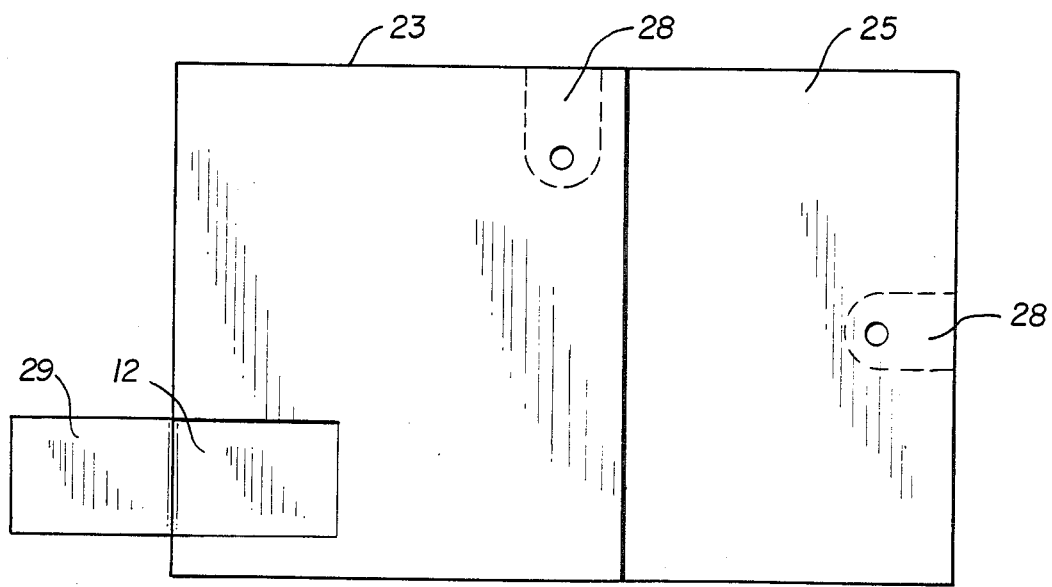
FIG. 7

MULTI-LAYERED TARGET

BACKGROUND OF THE INVENTION

1. Field of the Invention

The present invention relates to multi-layered targets. More particularly, the present invention relates to a multi-layered target having an outer covering layer presenting a plurality of target dots arranged in a desired pattern or design.

2. Description of the Prior Art

Numerous types of targets have been used in an effort to judge and improve a shooter's aim. Generally, these targets are of the form of the traditional bull's eye wherein the accuracy of a shot is measured by its distance from the center of a series of concentric rings.

A second type of target consists of a darkened silhouette figure of a man or a game animal. These targets are used to develop the aim of a marksman, hunter or law enforcement officer. Frequently, these targets include bull's eyes to indicate those areas of the silhouette figure where a shot would result in a fatality, a serious bodily injury, or mere incapacity.

Although these targets are useful for judging a shooter's accuracy and helping him to improve his aim, they provide only a temporary reward to the shooter. A successful shooter will have only a paper target filled with bullet holes to remind him of his successful shots. Accordingly, a target which provides a more aesthetically pleasing record of a shooter's success is needed.

SUMMARY OF THE INVENTION

In accordance with the present invention there is provided a multi-layered target which adds a new and different approach to the improvement and judging of a shooter's aim. A multi-layered target is provided which has a metallic sheet layer formed of any suitable metal or metal alloy. Upon this metallic sheet layer is provided a covering layer upon which a plurality of target dots are imprinted. These target dots may be arranged to form any desired design or pattern. The target dots may also form the outline of a desired design.

When a projectile such as bullet or pellet passes through one of the target dots imprinted on the covering layer, it will also penetrate the metallic sheet layer. In this manner, the successful targeting of each of the dots on the covering layer will result in the production of the desired pattern on the metallic sheet layer.

The metallic sheet layer is preferably made of a metal or metal alloy which has specific properties. The thickness, composition and hardness of the metallic sheet layer must be matched to the mass and velocity of the bullet or pellet being used. Preferably, the bullet should leave a generally circular hole in the metallic sheet layer. The bullet hole should be surrounded by a generally circular depression that will reflect light like a parabolic reflector, thereby enhancing the design outline produced by the target dots. Because the metallic sheet layer is usually very flexible, when small caliber bullets or pellets are used, a backing layer formed of cardboard or other sturdy material is preferably glued or otherwise attached to the metallic sheet layer to provide sufficient rigidity to prevent any undesired deformation of the metal which would detract from its aesthetic appearance.

The result of a series of successful shots will be the reproduction on the metallic sheet layer of the design of the target dots on the covering layer. The metallic sheet layer can be framed and hung on a wall in a shooter's den, much like any other trophy. Marksmen with little or no artistic ability can create works of art worthy of permanent display by simply hitting each of the target dots of the pattern.

BRIEF DESCRIPTION OF THE DRAWINGS

FIG. 5 is an isometric view of a target according to the present invention as packaged in one form of a mailing container.

FIG. 6 is a close up view of a target dot which is used on the target of FIG. 1.

FIG. 7 is a back view of the target of FIG. 5.

DESCRIPTION OF THE PREFERRED EMBODIMENTS

Figure 1:
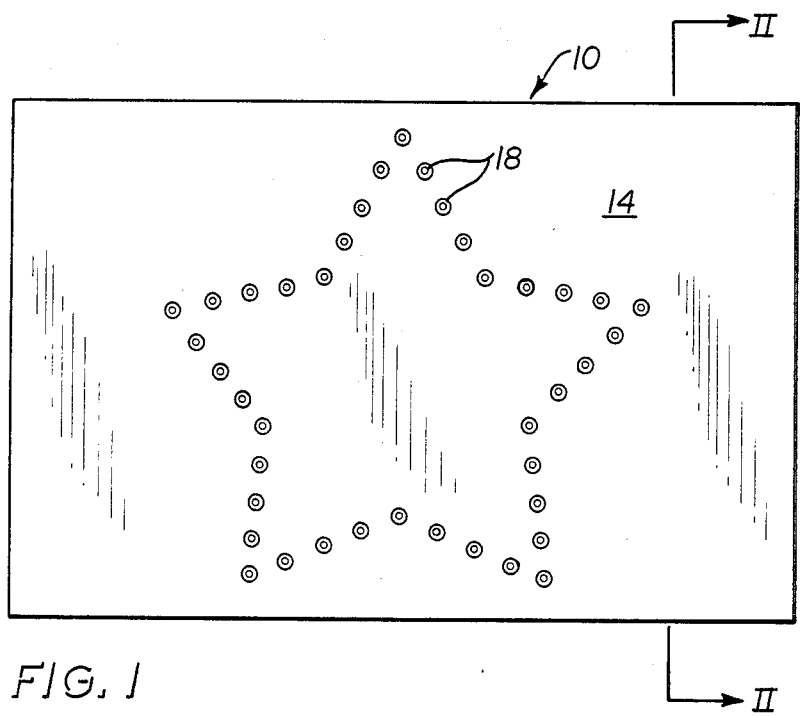
FIG. 1 is a front elevational view of the target of present invention.
Figure 2:
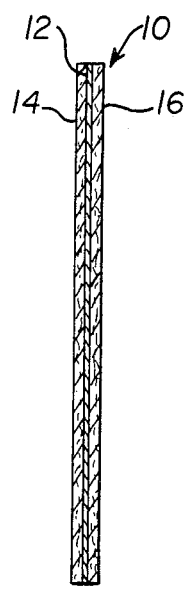
FIG. 2 is a cross-sectional view of the target taken along line II—II of FIG. 1.

As shown in FIGS. 1 and 2, my multi-layered target 10 is composed of metallic sheet layer 12, covering layer 14 and backing layer 16. Preferably, metallic sheet layer 12 is a flexible sheet formed from a metal or metal alloy. Covering layer 14 is preferably formed from cardboard. Alternatively, covering layer 14 can be formed of a paper sheet or of shrink wrap or other suitable plastic material positioned over the metallic sheet layer 12. Backing layer 16 is preferably formed of cardboard or other sturdy material and is glued or otherwise attached to metallic sheet layer 12 so as to provide metallic sheet layer 12 with sufficient rigidity to function as a target protect the metallic sheet layer 12 from deformation. A plurality of target dots are printed on covering layer 14 and are arranged to form any desired design or pattern thereon.

When a shooter takes aim at target dots 18, he is, in effect, aiming at both covering layer 14 and the underlying metallic sheet layer 12. Thus, a successful shot at a target dot 18 on covering layer 14 will result in a successful shot at metallic sheet layer 12.

If a shooter successfully shoots relatively close to all of the target dots 18 on covering layer 14, he will roughly duplicate the target dot pattern on metallic sheet layer 12. In that event, metallic sheet layer 12 provides a permanent and aesthetically pleasing record of the shooter's successful day. Metallic sheet layer 12 may be framed and hung as a constant reminder of the shooter's accuracy.

Figure 3:
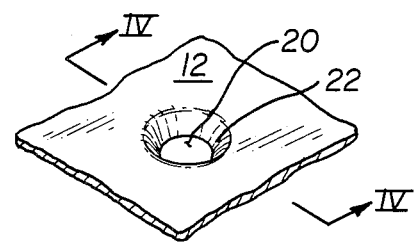
FIG. 3 is an isometric view of a portion of the metallic sheet layer of my invention after a bullet has been shot the target.
Figure 4:
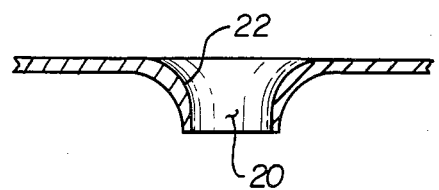
FIG. 4 is a cross-sectional view of a portion of the metallic sheet layer taken along line IV—IV of FIG. 3.

For metallic sheet layer 12 to provide a more attractive display, the hole produced by a bullet in metallic sheet layer 12 should be of a specific nature. FIGS. 3 and 4 illustrate the desired result of a bullet acting on metallic sheet layer 12. Preferably, the bullet will enter and exit metallic sheet layer 12 leaving a generally circular opening 20. The force of the bullet on metallic sheet layer 12 will create a generally circular depression 22 which surrounds opening 20.

Depressions 22 will reflect light at different angles than the non-deformed portions of metallic sheet layer 12. These depressions 22 will fill in the gaps in the outline between the openings 20, thereby creating a continuity in the outline design. This will enhance the beauty of the final design created on metallic sheet layer 12.

It will be obvious to those skilled in the art that the impression which a bullet creates on the metal target sheet is a function of the mass and velocity of the bullet and the composition, thickness and hardness of the metallic target sheet. Different masses and velocities of bullets will work best with various target compositions, thicknesses and hardnesses. I have experimented with a number of bullet sizes and have determined that pellet guns having a velocity over 250 feet per second and .22 caliber rifles produce the desired opening 20 and depressions 22 when using ordinary aluminum-alloy metal sheets.

If the metal chosen for metallic sheet layer 12 is too hard, the bullet will tend to rip at metallic sheet layer 12 and create a flat hole. If the metal chosen for metallic sheet layer 12 is too soft, the openings 20 tend to be too flat and the depressions 22 may not be formed. If a bullet is shot at too great a velocity, it will pierce metallic sheet layer 12 without leaving a significant depression 22. Those metal alloys which produced the best results using pellet guns having a velocity over 250 feet per second and .22-caliber rifles include:

3003, -0, H12 hardness and from 0.005 to 0.015 inches thick

Alloy #3004, -0, H12, or H14 hardness and from 0.005 to 0.015 inches thick

A further enhancement of my invention is the provision of a cardboard mailing container 24 for the target. As shown in FIGS. 5 and 7, container 24 forms a box which surrounds metallic sheet layer 12 and backing layer 16. Front portion 23 of container 24 acts as the covering layer for the target. The target dots 26 can be imprinted directly on front portion 23 of the mailing container 24. The metallic sheet layer 12 and attached backing layer 16 are enclosed within the mailing container 24, between front portion 23 and back portion 25. Tabs 28 are provided on back portion 25 and are used to hang the mailing container 24 for shooting.

In addition tabs 28, there is also provided tab 29 which can be pulled out from the back portion 25. Tab 29 is larger than tabs 28 and is not used to hang the target. Instead, as shown in FIG. 5, tab 29 is provided with two target dots 30 which are used to align the gun before shooting at mailing container 24.

In addition to paper or cardboard materials, covering layer 14 can also be formed from heat shrink plastic wrap or any other material to which target dots 18 can be imprinted. The heat shrink plastic wrap may also function as a package container for the multi-layered target 10.

Preferably, target dots 18 are of the form shown in FIG. 6. The target dots are preferably printed in a black and white color pattern. The remaining portion of covering layer 14 between the target dots 18 is preferably colored in a pastel.

I claim:

1. A multilayered target for projectiles comprising:
   (a) a metallic sheet layer; and
   (b) a covering layer having a first side thereof positioned over one side of said metallic sheet layer, said covering layer formed of a material to which target dots may be imprinted and through which a projectile may pass, said covering layer having an opposite side thereof presenting a plurality of target dots arranged in a desired pattern whereby directing one of a plurality of projectiles to pass through each of said target dots of said covering layer creates a plurality of holes in said metallic layer arranged in said desired pattern.

2. The target in claim 1 wherein said metallic sheet layer is formed of a suitable composition, thickness and hardness so that bullets passing through said metallic sheet layer create generally circular holes therein with generally circular depressions surrounding each of said holes.

3. The target in claim 1 wherein said covering layer is formed of a plastic material.

4. The target in claim 1 further comprising a backing layer to which said sheet layer is attached.

5. The target in claim 2 wherein said metallic sheet is formed from an aluminum alloy.

6. The target in claim 5 wherein said metallic sheet layer is formed from a composition selected from the group of aluminum alloys consisting of Alloy #3003, -0 hardness; Alloy #3003, H12 hardness; Alloy #3004, -0 hardness; Alloy #3004, H12 hardness; and Alloy #3004 H14 hardness.

7. The target in claim 1 wherein said covering layer is formed from cardboard.

8. The target in claim 7 wherein said covering layer is a face of a cardboard mailing package which surrounds said sheet layer and provides a means to distribute said target through the mail.

9. The target in claim 8 further comprising at least one tab provided integrally as part of said cardboard mailing package, said tab adapted to be pulled away from said target in order to hang said target.

10. The target in claim 8 further comprising a tab attached to said cardboard mailing package, said tab adapted to be pulled out from said package, said tab presenting at least one additional target dot.

11. The target of claim 4 wherein said backing layer is formed of cardboard.

* * * * *